W. T. WILLIE.
Convertible Cotton-Planter.

No. 223,204.  Patented Dec. 30, 1879.

WITNESSES:
Herm. Lauten.
Story B. Ladd.

INVENTOR:
William Thomas Willie
By Paine and Grafton
Attorneys

UNITED STATES PATENT OFFICE.

WILLIAM T. WILLIE, OF INDEPENDENCE, TEXAS.

IMPROVEMENT IN CONVERTIBLE COTTON-PLANTERS.

Specification forming part of Letters Patent No. 223,204, dated December 30, 1879; application filed December 20, 1877.

*To all whom it may concern:*

Be it known that I, WILLIAM THOMAS WILLIE, of Independence, in the county of Washington and State of Texas, have invented certain new and useful Improvements in Convertible Cotton-Planters; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention consists of certain improvements in the construction of cotton and corn planters, the object being to furnish a machine that can be used for either purpose, as well as for the planting of all other similar crops, the present application being limited to those features of the machine which are applicable to cotton-planting, and it will be best understood from the following description and claim.

Figure 1:
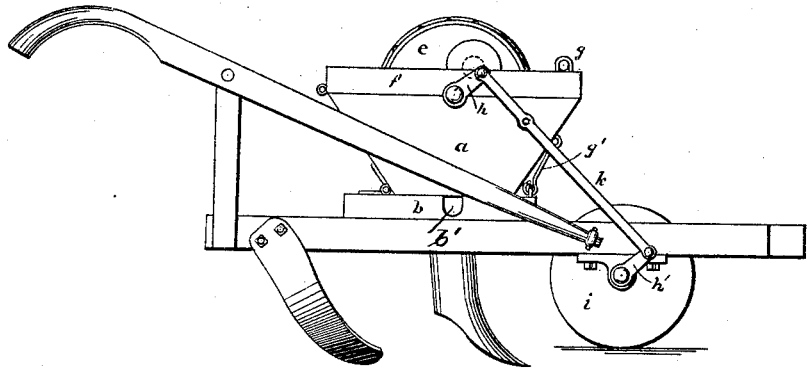
Figure 2:
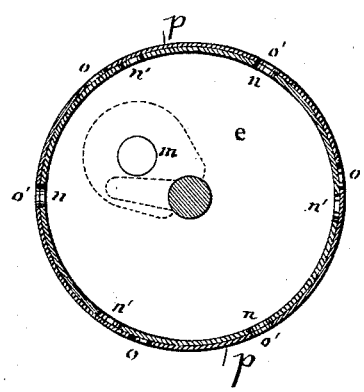

Figure 1 is a side elevation of the machine, and Fig. 2 is a section through the cotton-seed drum.

The machine belongs to the class which have a wheel in front of the drill, from which motion is communicated to the seed-dropping mechanism, and side plows behind the drill for covering the seed.

The hopper $a$ is hinged to the bed $b$, so that it can be turned back to expose the seed-dropping mechanism used for corn, (not herein shown or described,) but which is designed to be removed when the machine is used for planting cotton.

The journals of the drum $e$ rest in bearings formed half in the sides of the hopper $a$ and half in the frame $f$, which is hinged to the back of the hopper, and forms its top edge. The frame $f$ is fastened by the hasp and staple $g$, and the hopper $a$ is fastened down to the bed by the hook $g'$.

The connecting rods $k$, one on each side of the machine, are attached to the crank-arms $h$ of the drum $e$ and to the arms $h'$ of the wheel $i$. The drum $e$ has an opening, $m$, in one side, closed by a slide or door, for inserting the cotton-seed. The periphery of the drum is provided with holes $n\ n'$, and encircling the drum there is a band, $p$, which slides freely on the drum, and is provided with holes $o\ o'$ corresponding to the holes $n\ n'$.

The holes $n\ n'$ and the holes $o\ o'$ are arranged in sets, and the holes of each set, as the holes $n$, are placed at regular intervals, but the interval between the holes of one set and those of another is slightly different from the interval between the holes of either set. If the band $p$ is moved so that the holes $o$ come over the holes $n$, then the holes $o'$ will be opposite the holes $n'$, and as the drum revolves the seed will be delivered through every opening; but if the openings $o'$ are opposite the holes $n$, then the holes $n'$ will be closed, and the seed will only be delivered through one set of holes. The holes may thus be entirely closed, or all opened, or only one series opened; and it is evident that the number of sets of holes may be increased, if desired.

The revolution of the drum keeps the seeds stirred and throws them out regularly. They are discharged through the hopper into the furrow made by the drill, and covered by the rear plows.

This machine may be easily converted into a corn-planter by removing the drum $e$ and adjusting a suitably-constructed corn-dropping mechanism in the bearings $b'$, formed in the bed $b$. The hopper, being hinged, may be readily thrown back to permit of this adjustment.

I claim as my invention—

In a convertible cotton-planter, the combination of the frame or bed $b$, having bearings $b'$, hinged hopper $a$, frame $f$, hinged to hopper $a$, and drum $e$, substantially as and for the purpose set forth.

In testimony that I claim the foregoing as my own I affix my signature in presence of two witnesses.

WILLIAM THOMAS WILLIE.

Witnesses:
 JOHN M. KNIGHT,
 L. W. HAGY.